Dec. 11, 1962    M. H. McGRATH    3,068,315
JOINT FOR ALUMINUM SHEATHED CABLES
Filed Jan. 25, 1960

INVENTOR.
MARTIN H. McGRATH
BY
Emery, Whittemore, Sandoe & Graham
ATTORNEYS

United States Patent Office 3,068,315
Patented Dec. 11, 1962

3,068,315
JOINT FOR ALUMINUM SHEATHED CABLES
Martin H. McGrath, New York, N.Y., assignor to General Cable Corporation, New York, N.Y., a corporation of New Jersey
Filed Jan. 25, 1960, Ser. No. 4,239
3 Claims. (Cl. 174—84)

This invention relates to an improved method of jointing and terminating electric cable having an extruded aluminum sheath, and to the product of such method.

Cables having lead sheaths are known to the art and have been used for many years. Over the years of use, methods for cable terminating, a term which includes jointing of two lengths of cable as well as connecting the cable to terminal apparatus, have been developed. A cable joint is, in effect, two cable terminations. For example, jointing of lead sheathed cables has been effected by sliding a lead sleeve over the end of one of the cables to be connected. After the cable conductors have been connected and suitably insulated the sleeve is slid over the connection and joined at its ends to each sheath by a lead wipe to form a continuous casing over the core connection. This method of jointing has been both effective and easy. The heat necessary to bond the sleeve to the sheath is not so high that the cable core is damaged thereby.

However, the advantages of an aluminum sheath in cable construction, such as the greater tensile strength and lighter weight of the sheath, has resulted in the development of cables having aluminum sheaths extruded thereon. While aluminum sheaths offer certain advantages over lead sheaths, greater difficulties are encountered in terminating the aluminum sheaths. The aluminum cable sheath cannot be bonded by a wiped joint as can the lead sheath.

It is therefore one object of this invention to provide an improved cable construction which may be easily jointed and terminated in the field.

It is practicable to weld aluminum by using an inert gas atmosphere, for example by the "Heliarc" process. However, it is not feasible to employ a welded connection to the sheath. The high welding temperatures would destroy the integrity of the conductor insulation underlying the sheath. Further, any oil or grease on the sheath, from contact with an oil impregnated insulation, will prevent or make difficult the welding of the sheath.

It is therefore a further object of this invention to provide a cable construction in which the termination may be made by using a welding process.

It is further desirable that the cable joint made by welding a joint casing to an aluminum sheath be capable of being opened, for example for repairs, and for subsequent rejoining in the field.

It is therefore a further object of this invention to provide an improved method of jointing cable in which the joint may be opened for repairs and subsequently reclosed in the field.

The art is familiar with the use of a steel ferrule welded to the end of a steel pipe into which cable subsequently is pulled. The ferrule has been provided with an internal flange welded to the pipe and an outer concentric flange overlying the inner flange. A sleeve may be positioned over a cable splice and be welded to the outer flanges on the ferrules secured on each pipe to provide a pressure-tight joint. During welding, the length of path between the weld and the cable provided by the ferrule, coupled with the heat dissipation throughout the ferrule length, reduces heat transmission to the inner flange sufficiently to prevent damage to the cable, loosely enclosed by the pipe. It is, of course, not possible to use such a ferrule with a cable construction having an extruded, close fitting aluminum sheath, because the inner flange cannot be welded to the cable sheath without destroying the underlying insulation.

It is therefore a further object of this invention to provide an improved method of terminating cable in which an integral ferrule is formed on the end of the aluminum sheath of the cable from the sheath itself.

In accordance with these objects there is provided in a preferred embodiment of this invention an aluminum sheathed cable at one end of which is provided a turned-back portion of the aluminum sheath. The turned-back portion is integrally formed with the aluminum sheath and constitutes an overlying concentric annular ferrule.

A method of jointing aluminum sheathed cable in accordance with this invention comprises slipping an aluminum sleeve over one end of one of the cables to be jointed together, turning back the aluminum sheath into a concentric, overlying ferrule integrally formed with the sheath, joining and insulating the conductors, slipping the sleeve over the joined conductors to extend between the ferrules on each end of the cables to be spliced together, and then welding the ends of the sleeve to the outer ends of the respective ferrules. The welding is carried out in an atmosphere of inert gas in conventional fashion, for example by the "Heliarc" process.

This invention will best be understood by reference to the following description taken in combination with the accompanying illustrative drawings, of which:

Figure 1:
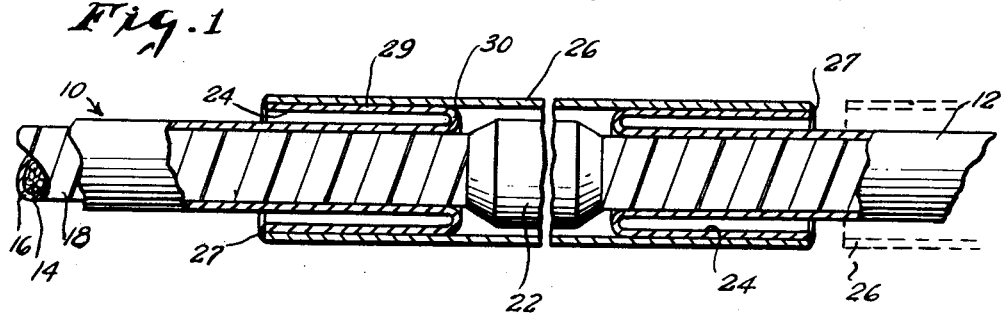
FIGURE 1 is a partially sectioned side elevation of a cable splice or joint made in accordance with this invention.

In FIGURE 1 there is shown a cable joint comprising a splice of two cables 10 and 12. Each cable comprises a conductive core 14 over which an annular wall of insulation 16 is applied. A suitable electrostatic shield, such as a helically wrapped copper tape 18, may be applied over the insulation. It will be understood that this cable construction is merely exemplary and that other cable types having one or a plurality of conductors may be used. Since the invention is not dependent upon the specific type of cable core construction, illustration of alternative constructions is unnecessary. A soft annealed aluminum sheath is extruded over the cable core to encase the cable.

At the end of each cable there is provided a concentric overlying ferrule 24 integral with the aluminum sheath, spaced radially outwardly therefrom, and formed by turning back the end of the sheath. An aluminum sleeve 26 overlies the insulated cable joint, indicated generally by 22. This sleeve was slipped over one end of one of the cable lengths prior to jointing the conductors, and subsequently slipped back to enclose the joint. The method of splicing the cable conductors will depend on the cable involved and forms no part of this invention. Each end of the sleeve is joined to one of the ferrules by an annular weld to provide a continuous pressure-tight joint casing. The sleeve is dimensioned with the internal diameter thereof matching the external diameter of the ferrules. The outer diameter of the ferrules is in turn dimensioned to provide the necessary clearance for the diameter of the conductor splice.

The ferrule is provided with a flange 29 substantially concentric with the sheath and integrally formed with and supported by a U shaped bend 30. The ends of the sleeve 26 are welded to the outer ends of the ferrule flanges 29. The heat of welding of the annular beads 27 is transmitted to the cable sheath only through the ferrule. The length of the flange of the ferrule is dimensioned so that the heat transmission through the ferrule from the weld bead is less than that which would damage the cable components. The ferrule provides radiating surfaces exposed to the air to dissipate the heat of welding, thus preventing the sheath temperature from becoming excessive. To further decrease heat flow to the sheath, water or other fluid may be circulated in the hollow of the ferrule, or a heat insulating packing may be inserted therein during the welding operation. Moreover, the welds may be made in small increments and the time-welding cycle selected to limit heat transfer to the cable. Therefore, the cable may be jointed or terminated within a welded enclosure suitable for pressurization and for complete protection of the cable components, all without heat damage to the cable insulation.

The cable termination or joint made according to the present invention is easily opened and resealed, for example for repairs. To open the termination, the weld bead is merely cut off by sawing or otherwise cutting through both the sleeve and the flange near the weld bead. The termination may be resealed by rewelding of the ends of the sleeve to the ferrules. The axial length of the ferrule flange may be dimensioned to provide material for a number of openings and reclosings in accordance with the application intended.

The ferrule may be formed on the cable at the place of manufacture thereof, or in the field at the place of installation. One method for ferrule formation suitable for use at the place of manufacture is illustrated sequentially in FIGURES 2 and 3.

Figure 2:
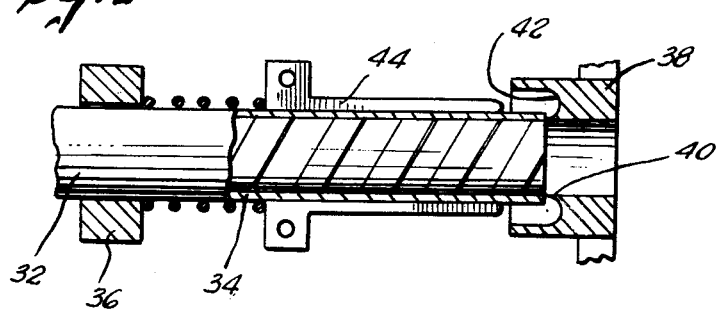
FIGURES 2 and 3 are partially sectioned views showing the formation of the cable shown in FIGURE 1.
Figure 3:
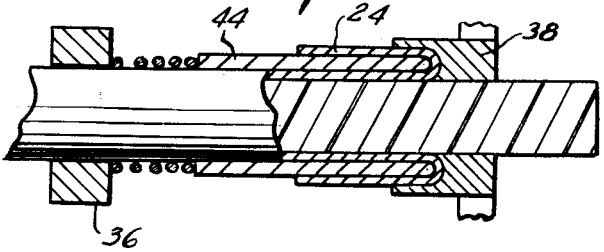

In FIGURES 2 and 3 there is shown a cable 32 having an extruded aluminum sheath 34 thereon. The cable is gripped by split annular jaws 36 and the end of the cable is pressed forward relative to an annular ferrule-forming die 38. The die comprises an annular wedge-shaped tip 40 defining an aperture extending axially therethrough of the same diameter as the diameter of the insulated cable core. Thus, as the cable is forced into the die, the edge 40 will be inserted betewen the sheath and the cable components. The sheath will be turned back by the U shaped recess 42 of the die to form an overlying ferrule 24, as is best shown in FIGURE 3. To ensure consistent spacing between the concentric ferrule and the sheath, an annular guide 44 may be temporarily provided on the cable sheath.

Figure 4:
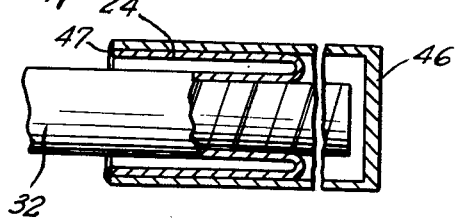
FIGURE 4 is a sectioned view of a cable with a shipping cap.

When the cable is fabricated in this fashion at the factory it is advisable to provide a protective cover for the end thereof as is shown in FIGURE 4. In FIGURE 4 there is shown a cable 32 to which an end cap 46 is affixed by bead weld 47 to the ferrule 24. The end cap protects the cable components during handling thereof and prevents leakage of oil from cable using an oil impregnated insulation.

This cable may also be fabricated in the field. In the field the utilization of a die as illustrated for ferrule formation may not be practical due to the danger of damaging the insulation without the careful controls available in the factory. In the field, therefore, it is advisable to form the ferrule in accordance with the method and apparatus set forth in the Jack Jerome application Serial No. 4,240, filed January 25, 1960, for "Method and Apparatus for Turning Back Cable Sheath," assigned to the assignee of the present application.

It will be noted that in addition to protecting the cable components from the welding heat, the ferrule provides separation of the weld bead location from the cable insulation. This is advantageous in preventing contamination of the weld material by oil escaping from the insulation of oil impregnated cable, since the presence of oil will prevent proper welding of the aluminum.

This invention may be variously modified and embodied within the scope of the subjoined claims.

What is claimed is:

1. A cable system comprising a first and second cable, each of said cables comprising conductors enclosed within a close-fitting annealed aluminum sheath, each of said cables being provided with a ferrule on one end thereof, said ferrule comprising an integral portion of said sheath turned back from the end into a concentric overlying flange, the conductors at one end of each of said cables being spliced together, and an aluminum sleeve extending between and overlying the ferrules on the ends of said cable and enclosing said splice, said sleeve being welded at each end hereof to a respective flange to encase said splice in a pressure-tight sheathing.

2. In combination, a cable comprising an insulated conductor and having a close-fitting extruded protective aluminum sheath, a concentric ferrule overlying the end of said cable and spaced radially outwardly from said sheath, said ferrule comprising an integral turned back end of said sheath, a termination enclosure having a cylindrical wall portion overlying the ferrule on the end of said cable, said cylindrical wall portion being welded to the end of said ferrule.

3. The combination in accordance with claim 2 in which said termination enclosure comprises an end cap encasing the end of said cable.

References Cited in the file of this patent

UNITED STATES PATENTS

| | | |
|---|---|---|
| 1,915,743 | Meerbeck | June 27, 1933 |
| 1,947,454 | Bennett | Feb. 20, 1934 |
| 2,173,643 | Moser | Sept. 19, 1939 |
| 2,798,113 | Koller | July 2, 1957 |
| 2,799,608 | Scott | July 16, 1957 |
| 2,800,344 | Wolcott | July 23, 1957 |
| 2,983,779 | Dunmire et al. | May 9, 1961 |